United States Patent
Hayman

(10) Patent No.: US 7,650,866 B2
(45) Date of Patent: Jan. 26, 2010

(54) LIGHT LOAD AIR DELIVERY SYSTEM FOR AN INTERNAL COMBUSTION ENGINE

(75) Inventor: Alan W. Hayman, Romeo, MI (US)

(73) Assignee: GM Global Technology Operations, Inc., Detroit, MI (US)

(*) Notice: Subject to any disclaimer, the term of this patent is extended or adjusted under 35 U.S.C. 154(b) by 0 days.

(21) Appl. No.: 11/561,017

(22) Filed: Nov. 17, 2006

(65) Prior Publication Data

US 2008/0115755 A1    May 22, 2008

(51) Int. Cl.
*F02M 35/104* (2006.01)
(52) U.S. Cl. .......... 123/184.47; 123/308; 123/432; 701/103
(58) Field of Classification Search ........... 123/184.21, 123/184.24, 184.25, 184.34, 184.35, 184.42, 123/184.43, 184.47, 184.48, 308, 432; 701/103, 701/104
See application file for complete search history.

(56) References Cited

U.S. PATENT DOCUMENTS

| | | | | |
|---|---|---|---|---|
| 4,240,387 A | * | 12/1980 | Motosugi et al. | 123/184.45 |
| 4,262,639 A | * | 4/1981 | Motosugi et al. | 123/184.45 |
| 4,300,500 A | * | 11/1981 | Motosugi et al. | 123/308 |
| 4,381,749 A | * | 5/1983 | Sugiyama | 123/432 |
| 4,519,350 A | * | 5/1985 | Oda et al. | 123/308 |
| 4,630,575 A | * | 12/1986 | Hatamura et al. | 123/184.48 |
| 4,633,844 A | * | 1/1987 | Okimoto | 123/406.45 |
| 4,714,063 A | * | 12/1987 | Oda et al. | 123/308 |
| 4,779,594 A | * | 10/1988 | Oda et al. | 123/432 |
| 5,054,439 A | * | 10/1991 | Akagi et al. | 123/184.43 |
| 5,351,668 A | * | 10/1994 | Gatellier | 123/568.13 |
| 5,709,191 A | * | 1/1998 | Monnier | 123/302 |
| 6,679,228 B1 | * | 1/2004 | Confer et al. | 123/516 |

OTHER PUBLICATIONS

"2003 BMW 325i 2.5L 16 [E46/M56] ECU Mapping" FEV, presentation date Dec. 8, 2004.

* cited by examiner

*Primary Examiner*—Stephen K Cronin
*Assistant Examiner*—Johnny H Hoang
(74) *Attorney, Agent, or Firm*—Quinn Law Group, PLLC

(57) ABSTRACT

A light load air delivery system for an internal combustion engine having a cylinder head defining at least one intake port selectively opened by a poppet valve which is biased against a valve seat area of the cylinder head. The light load air delivery system includes an intake duct and a controllable valve. A light load air intake passage operates to communicate intake air from the intake duct to the controllable valve. Additionally, a light load air intake manifold is configured to selectively receive intake air from the controllable valve. A feed passage receives the intake air from the light load air intake manifold and communicates the intake air to the respective one of the at least one intake ports at a point substantially adjacent to the valve seat area. In a preferred embodiment, the light load air intake manifold is integral to said intake manifold.

19 Claims, 2 Drawing Sheets

LIGHT LOAD AIR DELIVERY SYSTEM FOR AN INTERNAL COMBUSTION ENGINE

TECHNICAL FIELD

The present invention relates to light load air delivery systems for internal combustion engines.

BACKGROUND OF THE INVENTION

Typical automotive internal combustion engines utilize an idle air control system for the control or stabilization of engine speed during idle operation. Such a system may have an electrically operated valve assembly, which modulates the air passing through a conduit, which bridges the throttle plate, contained within a throttle body, of the air intake to the engine. Internal combustion engine idle air control systems typically meter inlet air to the intake manifold of the engine in response to a difference between actual engine speed and a relatively low target engine speed. Change in engine torque load, for example resulting from change in engine driven accessory load, can force engine speed away from the target speed.

Certain engine torque load changes can occur very rapidly. For example, a step change in torque load can occur during certain transient maneuvers. To reject such rapid torque load changes, the idle air control system must be very responsive. To compensate for an engine load change, a corresponding change in engine torque is administered by changing an amount of fuel and air admitted to engine cylinders. The idle air control system provides for a desired time rate of change in intake air. The fuel control system reacts to the time rate of change in intake air to provide a corresponding time rate of change in injected fuel.

SUMMARY OF THE INVENTION

A light load air delivery system is provided for an internal combustion engine having a cylinder head defining at least one intake port selectively opened by a poppet valve which is biased against a valve seat area of the cylinder head. The light load air delivery system includes an intake duct and a controllable valve. A light load air intake passage operates to communicate intake air from the intake duct to the controllable valve. Additionally, a light load air intake manifold is configured to selectively receive intake air from the controllable valve. A feed passage receives the intake air from the light load air intake manifold and communicates the intake air to the respective one of the at least one intake ports at a point substantially adjacent to the valve seat area. The feed passage may have a generally stepped cylindrical bore configuration wherein the cylindrical bore has a first diameter in communication with the light load air intake manifold and a second diameter in communication with the intake port. Preferably, the second diameter is smaller than the first diameter. In a preferred embodiment, the light load air intake manifold is integral to the intake manifold. Additionally, an internal combustion engine is disclosed incorporating the light load air delivery system provided.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
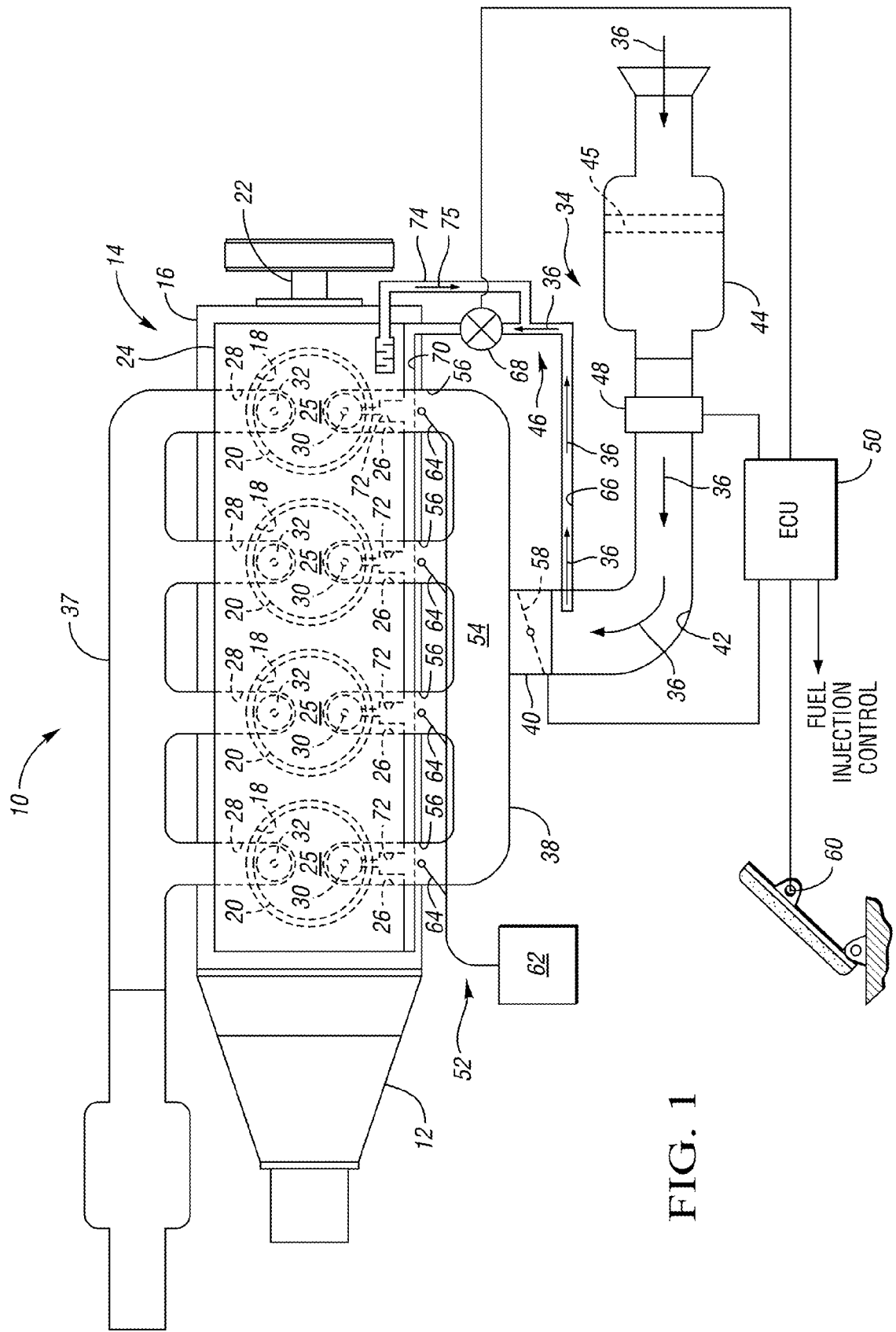
FIG. 1 is a schematic representation of an internal combustion engine incorporating a light load air delivery system consistent with the present invention.

Referring to the drawings wherein like reference numbers correspond to like or similar components throughout the several figures, there is shown in FIG. 1 a powertrain for a vehicle generally indicated at 10. The powertrain 10 includes a transmission 12 and an internal combustion engine 14. The internal combustion engine 14 includes a cylinder case or block 16 defining a plurality of cylinder bores 18. Each of the cylinder bores 8 has a piston 20 reciprocally movable therein. The pistons 20 are connected to a crankshaft 22 through connecting rods, not shown, to convert the reciprocal movement of the pistons 20 within the cylinder bores 18 into rotational torque, which is subsequently provided to the transmission 12.

A cylinder head 24 is mounted with respect to the cylinder block 16 and operates to seal the cylinder bores 18. The pistons 20, the cylinder bores 18, and the cylinder head 24 cooperate to form a variable volume combustion chamber 25. The cylinder head 24 defines intake ports 26 and exhaust ports 28. Each of the intake ports 26 are selectively opened to the respective combustion chamber 25 by a poppet valve 30. Similarly, the combustion chamber 25 is selectively opened to the respective exhaust port 28 by a poppet valve 32.

An air delivery system 34 is mounted with respect to the internal combustion engine 14 and operates to communicate a measured amount of intake air, indicated by arrows 36, to the engine for combustion with a measured amount of fuel within the combustion chambers 25. An exhaust system 37 is provided to communicate products of combustion from the internal combustion engine 14 to the atmosphere. The air delivery system 34 includes an intake manifold 38, a throttle body 40, an intake duct 42, an air box 44 having an air filter element 45, and a light load air delivery system 46. Additionally, the air delivery system 34 may include an air meter 48, which operates to measure the mass flow rate of intake air 36 passing through the intake duct 42 and communicate this value to an electronic control unit, or ECU 50, to ensure accurate fuel delivery by the fuel injection system 52. The ECU 50, preferably includes a pre-programmable digital computer operable to receive various inputs from the engine 14, transmission 12, and vehicle, not shown. Additionally, the ECU 50 operates to control various aspects of engine operation based on these inputs.

The intake manifold 38 includes a plenum volume 54 and a plurality of intake runners 56, which are operable to communicate intake air 36 from the plenum volume 54 to the respective intake ports 26. The throttle body 40 has a throttle blade 58 movable between a closed position, as shown in FIG.

1, and an open position to selectively and variably communicate intake air 36 from the intake duct 42 to the plenum volume 54. The throttle body 40, shown in FIG. 1, is an electrically actuated throttle body. The ECU 50 receives a throttle pedal position input from the throttle pedal or accelerator pedal 60. The ECU 50 then communicates a command signal to the throttle body 40 to effect movement of the throttle blade 58. The fuel injection system 52 receives pressurized fuel from a source of pressurized fuel 62 and the ECU 50 selectively controls the fuel injectors 64 to provide a measured and timed pulse of fuel into the intake runners 56 of the intake manifold 38 in response to the measured mass flow rate of intake air 36.

At low engine speeds and loads, such as idle operation, a sudden change in engine load as a result of the operation of various engine driven accessories such as, for example, power steering pumps, air conditioning compressors, alternators, etc. may cause the engine speed to drop or, in the worst case, stall. To compensate for this phenomenon, the intake air 36 introduced to the internal combustion engine 14 must be varied. The throttle body 40 typically has a very large bore area, and therefore may lack the refinement necessary to compensate for increased engine loads at idle or low load operation.

The light load air delivery system 46 of the present invention can provide the refinement necessary to control the introduction intake air 36 to the engine 14 at low speed, low load operating conditions. The light load air delivery system 46 includes a light load air intake passage 66 operable to communicate intake air 36 to a controllable valve 68. The controllable valve 68 operates to selectively and/or variably communicate intake air 36 to a light load air intake manifold 70. In the preferred embodiment, the valve 68 is controlled by the ECU 50. The light load air intake manifold 70 operates to communicate intake air 36 to a plurality of feed passages 72 that are at least partially defined by the cylinder head 24. The feed passages 72 extend through the cylinder head 24 into a respective one of the intake ports 26. The location and geometry of the feed passages 72 will be discussed in greater detail hereinbelow with reference to FIG. 2. By configuring the light load air intake passage 66 upstream of the throttle body 40, the intake air 36 provided to the light load air delivery system 46 is at a pressure close to atmospheric pressure. Additionally, as shown in FIG. 1, a positive crankcase ventilation (PCV) passage 74 is provided to communicate "foul side" PCV gases 75 to the light load air intake passage 66 during light load engine operation.

Figure 2:
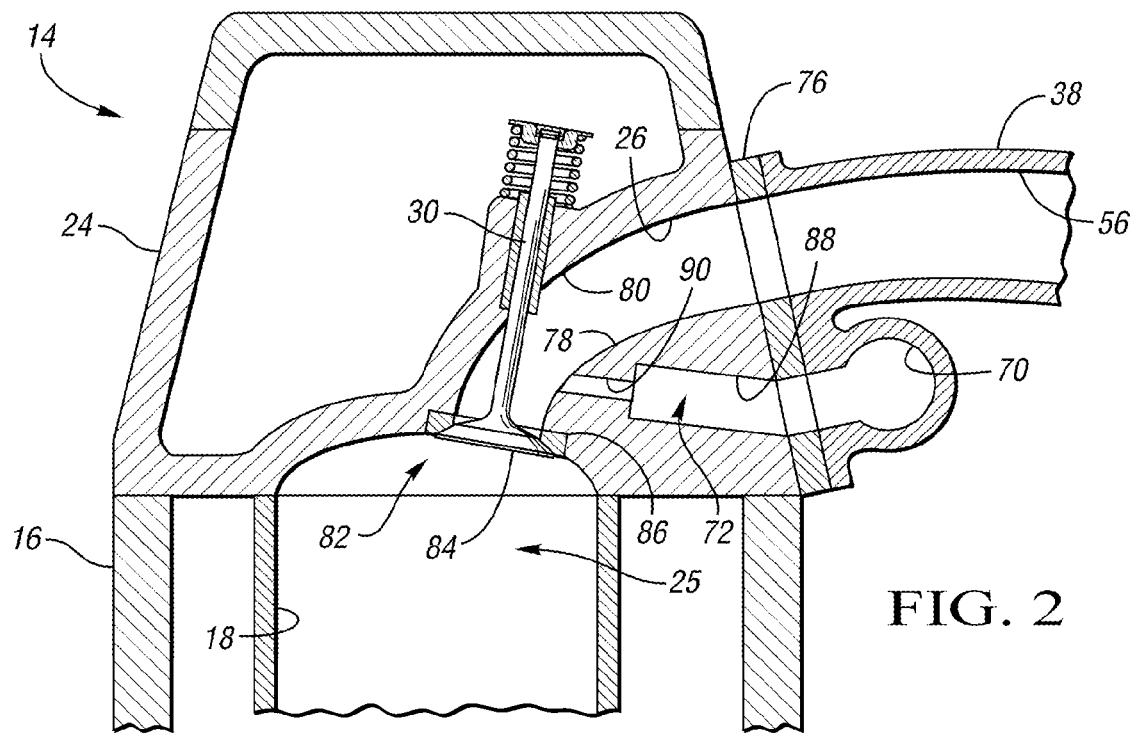
FIG. 2 is a schematic partial cross sectional view of a cylinder head and intake manifold for the internal combustion engine shown in FIG. 1 further illustrating aspects of the light load air delivery system.

Referring to FIG. 2, there is shown a partial cross sectional view of the internal combustion engine 14 further illustrating the light load air delivery system 46. In the preferred embodiment the light load air intake manifold 70 and the intake manifold 38 are integrally formed, as shown in FIG. 2. Further, a gasket member 76 is provided between the intake manifold 38 and the cylinder head 24. The intake port 26 includes a short turn radius portion 78 and a long turn radius portion 80. Additionally, the intake port 26 provides a valve seat area 82 to provide a sealing surface for the valve head 84 of the poppet valve 30. The valve seat area 82 may be configured to include a valve seat insert 86. However, those skilled in the art will recognize that the valve seat area 82 may be formed from the parent metal of the cylinder head 24.

The feed passage 72 in the preferred embodiment has a generally stepped bore configuration having a first bore portion 88 and a second bore portion 90. The second bore portion 90 is characterized as having a smaller diameter than the first bore portion 88. Additionally, the diameter and length of the second bore portion 90 should be chosen based on the operating characteristics of the individual engine and careful consideration should be paid to these dimensions to avoid tuning effects within the second bore portion 90. In the preferred embodiment the second bore portion 90 will intersect the intake port 26 on the short turn radius substantially adjacent to the valve seat area 82. With this orientation, the second bore portion 90 of the feed passage 72 will increase mixture motion within the cylinder bore 18 upon the opening of the poppet valve 30. The stepped nature of the feed passage 72 is especially suited for high volume automated manufacturing processes. Those skilled in the art will appreciate that it may be difficult to drill or otherwise form the second bore portion 90 for the entire length of the feed passage 72 due to the likelihood of tool breakage. Therefore, by providing the stepped bore configuration within the feed passage 72, the length of the second bore portion 90 may be reduced. Additionally, the second bore portion 90 may be formed slightly oversized to allow an insert defining a calibrated orifice, not shown, of the proper bore sizing to be press fit within the second bore portion 90 to further aid in manufacturing the light load air delivery system 46. This is especially beneficial since the insert can be easily changed when an alternate orifice size is desired.

Figure 3:
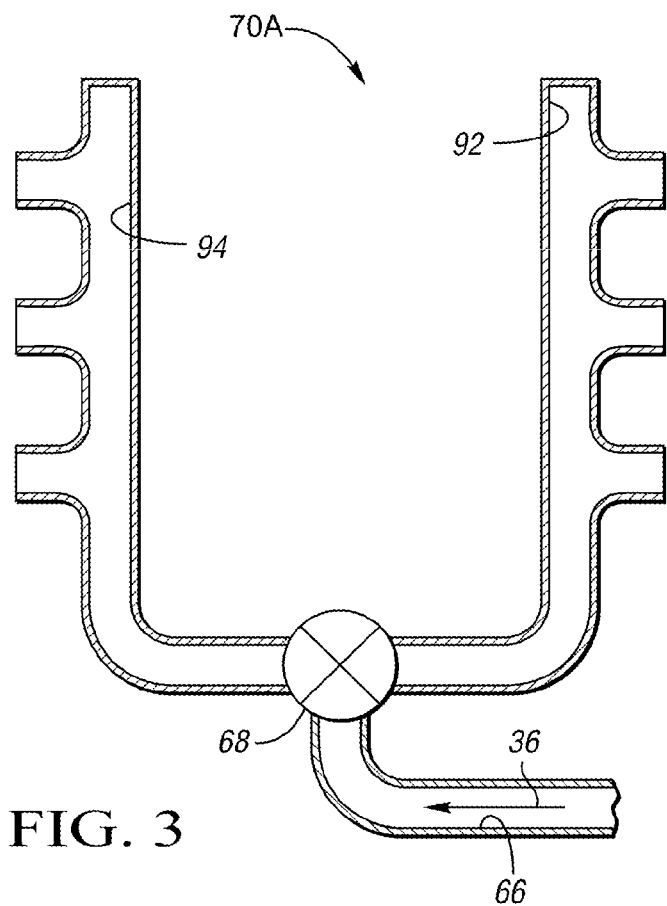
FIG. 3 is a partial schematic representation illustrating a light load air intake manifold configured for use with an internal combustion engine having a V-shaped configuration.

FIG. 3 illustrates a light load air intake manifold 70A configured for use with a V-type, six cylinder engine configuration. In this configuration, the light load air intake manifold 70A includes a first branch 92 and a second branch 94. The controllable valve 68 selectively and variably communicates intake air 36 from the light load air intake passage 66 to each of the branches 92 and 94 of the light load air intake manifold 70A. Alternately, the first and second branches 92 and 94 can be connected to one another prior to connection with the controllable valve 68.

While the best modes for carrying out the invention have been described in detail, those familiar with the art to which this invention relates will recognize various alternative designs and embodiments for practicing the invention within the scope of the appended claims.

The invention claimed is:

1. A light load air delivery system for an internal combustion engine having an intake duct and a cylinder head defining at least one intake port selectively opened by a poppet valve biased against a valve seat area of the cylinder head, the light load air delivery system comprising:
   a controllable valve;
   a light load air intake passage operable to communicate intake air from the intake duct to said controllable valve;
   a light load air intake manifold configured to selectively receive intake air from said controllable valve;
   at least one feed passage at least partially defined by the cylinder head and extending through the cylinder head into said at least one intake port substantially adjacent to the valve seat area; and
   wherein said at least one feed passage is operable to receive said intake air from said light load air intake manifold and to communicate said intake air received to said at least one intake port.

2. The light load air delivery system of claim 1, further comprising an electronic control unit operable to control said controllable valve.

3. The light load air delivery system of claim 1, further comprising:
   an intake manifold having a plenum volume and at least one intake runner operable to communicate intake air from said plenum volume to the at least one intake port; and wherein said light load air intake manifold is integral to said intake manifold.

4. The light load air delivery system of claim 1, wherein said at least one feed passage is a generally stepped cylindrical bore having a first diameter in communication with said light load air intake manifold and a second diameter in communication with the at least one intake port, and wherein said second diameter is smaller than said first diameter.

5. The light load air delivery system of claim 1, further comprising a positive crankcase ventilation passage provided in communication with said light load air intake passage.

6. The light load air delivery system of claim 1, wherein the at least one intake port includes a short turn radius and wherein said at least one feed passage communicates with the at least one intake port on said short turn radius.

7. The light load air delivery system of claim 1, further comprising:
an intake manifold having a plenum volume and at least one intake runner operable to communicate intake air from said plenum volume to the at least one intake port;
a throttle body operable to selectively communicate intake air from the intake duct to said plenum volume of said intake manifold; and
wherein said throttle body is in downstream intake air flow relation to said light load air intake passage.

8. An internal combustion engine configured to selectively receive intake air from an intake duct, the internal combustion engine comprising:
a cylinder head defining at least one intake port selectively openable by at least one poppet valve, wherein said poppet valve is biased against a valve seat area of said cylinder head;
a controllable valve;
a light load air intake passage operable to communicate intake air from the intake duct to said controllable valve;
a light load air intake manifold configured to selectively receive intake air from said controllable valve;
a plurality of feed passages at least partially defined by said cylinder head and extending through said cylinder head into said at least one intake port substantially adjacent to said valve seat area; and
wherein said plurality of feed passages are operable to receive intake air from said light load air intake manifold and to communicate said intake air to said at least one intake port.

9. The internal combustion engine of claim 8, further comprising an electronic control unit operable to control said controllable valve.

10. The internal combustion engine of claim 8, further comprising:
an intake manifold having a plenum volume and at least one intake runner operable to communicate intake air from said plenum volume to said at least one intake port; and
wherein said light load air intake manifold is integral to said intake manifold.

11. The internal combustion engine of claim 8, wherein each of said plurality of feed passages is a generally stepped cylindrical bore having a first diameter in communication with said light load air intake manifold and a second diameter in communication with the at least one intake port, and wherein said second diameter is smaller than said first diameter.

12. The internal combustion engine of claim 8, further comprising a positive crankcase ventilation passage provided in communication with said light load air intake passage.

13. The internal combustion engine of claim 8, wherein said at least one intake port includes a short turn radius and wherein said plurality of feed passages communicate with said at least one intake port on said short turn radius.

14. The internal combustion engine of claim 8, further comprising:
an intake manifold having a plenum volume and at least one intake runner operable to communicate intake air from said plenum volume to said at least one intake port;
a throttle body operable to selectively communicate intake air from the intake duct to said plenum volume of said intake manifold; and
wherein said throttle body is in downstream intake air flow relation to said light load air intake passage.

15. An internal combustion engine comprising:
an intake duct operable to communicate intake air to the internal combustion engine;
a cylinder head defining at least one intake port selectively openable by at least one poppet valve, wherein said poppet valve is biased against a valve seat area of said cylinder head;
a controllable valve;
a light load air intake passage operable to communicate intake air from the intake duct to said controllable valve;
a light load air intake manifold configured to selectively receive intake air from said controllable valve;
an intake manifold having a plenum volume and at least one intake runner operable to communicate intake air from said plenum volume to said at least one intake port;
a throttle body operable to selectively communicate intake air from said intake duct to said plenum volume of said intake manifold;
wherein said throttle body is in downstream intake air flow relation to said light load air intake passage;
at least one feed passage at least partially defined by said cylinder head and extending through said cylinder head into said at least one intake port substantially adjacent to said valve seat area; and
wherein said at least one feed passage is operable to receive said intake air from said light load air intake manifold and communicate said intake air to said at least one intake port.

16. The internal combustion engine of claim 15, wherein said light load air intake manifold is integral to said intake manifold.

17. The internal combustion engine of claim 15, wherein said at least one feed passage is a generally stepped cylindrical bore having a first diameter in communication with said light load air intake manifold and a second diameter in communication with the at least one intake port, and wherein said second diameter is smaller than said first diameter.

18. The internal combustion engine of claim 15, further comprising a positive crankcase ventilation passage provided in communication with said light load air intake passage.

19. The internal combustion engine of claim 15, wherein said at least one intake port includes a short turn radius and wherein said at least one feed passage communicates with said at least one intake port on said short turn radius.

* * * * *